Patent [19]

United States Patent [19]

Beetle

[11] 4,411,305
[45] Oct. 25, 1983

[54] METAL FOUNDING

[75] Inventor: Robert H. Beetle, Mountain Lakes, N.J.

[73] Assignee: Abex Corporation, New York, N.Y.

[21] Appl. No.: 244,110

[22] Filed: Mar. 16, 1981

[51] Int. Cl.³ .............................................. B22C 1/00
[52] U.S. Cl. .................................. 164/529; 164/271; 106/38.9
[58] Field of Search ........ 164/529, 271, 138, 516–519; 106/38.9

[56] References Cited

U.S. PATENT DOCUMENTS

| 3,723,140 | 3/1973 | Beall et al. | 501/6 |
| 3,726,695 | 4/1973 | Beall et al. | 501/5 |
| 4,093,017 | 6/1978 | Miller, Jr. et al. | 164/138 X |

FOREIGN PATENT DOCUMENTS

| 45-6525 | 3/1970 | Japan | 106/38.9 |
| 50-29694 | 9/1975 | Japan | 164/516 |
| 51-37822 | 3/1976 | Japan | 164/21 |

Primary Examiner—Kuang Y. Lin
Attorney, Agent, or Firm—Kinzer, Plyer, Dorn & McEachran

[57] ABSTRACT

Metal founding in a glass-ceramic mold which is reusable.

7 Claims, 1 Drawing Figure

U.S. Patent  Oct. 25, 1983  4,411,305
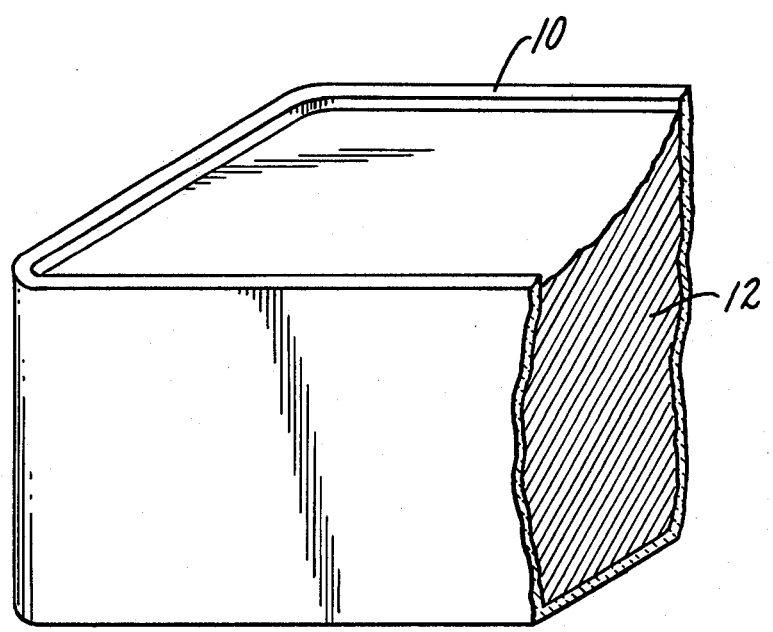

METAL FOUNDING

This invention relates to a reusable mold for foundry use. A reusable mold is commonly termed a permanent mold in the foundry industry.

The common form of foundry mold is sand, rammed around a pattern supported in a mold flask. The pattern is withdrawn, leaving the impressed mold cavity. The sand beforehand is usually mixed with an oil or binder to assure the sand particles hang together. Sand cores may be present within the mold cavity to account for cavities in the sand casting. Additionally, the sand and flask constitute a heat sink, withdrawing heat by conduction from the solidifying metal in the mold.

The ordinary sand mold is destroyed by the so-called shakeout procedure after the casting has set to a solid state. This represents a waste of time, if nothing else, and if possible from a cost and productivity standpoint the foundry manager will opt for a permanent mold, that is, one that can be used repeatedly until it is worn out. Graphite may be used for this purpose but because it oxidizes at elevated temperatures prevailing in a foundry it is necessary to resort to one of several methods to preserve the graphite mold against oxidation and/or to avoid carburization of the casting due to contact with the graphite.

Permanent molds may be made of alloys of copper which normally must be water-cooled, especially when pouring ferrous metal. Certain irons and high melting point steels may also be machined to define a mold cavity. They, like a copper base mold, must ordinarily be cooled so the internal temperature of the metal mold will not reach a point where the mold will be damaged.

Ideally, heat should be removed from the mold and casting as quickly as possible consistent with soundness and the type of microstructure wanted in the casting. However, a sharp gradient (hot inside wall surface, cold outside wall surface) imposes a thermal stress in the mold wall which must be resisted by the yield strength of the material constituting the permanent mold. Repeated thermal cycles of this type (thermal fatigue) represent a common source of failure in permanent (metal) molds.

It may also be mentioned in connection with the foregoing that binders commonly employed for sand molds gasify at the pouring temperature of the casting and may frequently cause surface imperfections, if not imperfections within the casting.

One object of the invention is a reusable mold having good thermal shock characteristics and sufficient refractoriness, especially when protected with an insulating coating or mold wash, for casting iron, steel or low temperature metals by providing for sufficient heat flow through the mold walls that the structure and stress are maintained within satisfactory limits while being able to control dissipation of heat from the molten metal in a controlled fashion if desired. Specifically it is an object of the invention to employ as a foundry mold a glass-ceramic which readily dissipates heat to a surrounding medium chosen according to the thermal needs of the mold and the metal being cast. With such a mold it is possible to solidify the metal in a manner that the mold is protected from localized overheating while heat flow can be at a rate where the cast metal will develop the proper structure, soundness and desired mechanical properties. It has been demonstrated in practice of the invention, for example, that a 3% phorphorus iron used commonly today for railroad brake shoes can be cooled rapidly enough in the present mold to preserve the glass-ceramic mold and still maintain hardness of the iron within the desired limits. The parameters for heat balance may be varied through a choice of mold washes, the specific glass-ceramic material and the external cooling medium.

The nature of the heat exchange will permit rapid reuse of the mold for high productivity rates, offering perhaps as many as twelve railroad brake shoes from one mold per hour, for example, through reuse of the glass-ceramic mold.

There appears to be no limit on the kind of glass-ceramic for my purpose of receiving a molten metal casting as long as the microstructure is predominantly a polycrystalline ceramic. In most instances of a glass-ceramic available at reasonable cost on a commercial scale for foundry use there will be a remnant glass phase (perhaps as low as one or two percent) completing a composite. This does not necessarily mean one hundred percent crystalline structure is not suitable for my purpose.

The foundry mold can be formed by any conventional glass forming process. The formed mold is then heat-treated to produce the desired glass-ceramic as the most common approach. These treatments are well known: see *Introduction to Ceramics* by Kingery and *Glass-Ceramics* by McMillan. Briefly, the material is a predominantly microcrystalline ceramic converted from an original glassy state by controlled nucleation and devitrification.

The most preferred material for my purposes as presently determined on the basis of actual foundry practice is represented by CORNING 9608 glass-ceramic in which the crystalline phase is spodumene; the next preferred material on the same basis is CORNING 9606 glass-ceramic in which the microcrystalline phase is cordierite. The two materials have low coefficients of thermal expansion.

EXAMPLE

Iron Cast in a Glass-Ceramic Mold

Several pounds of cast iron at 2200°-2300° F. were poured into a mold cavity simulative of a section of a cast iron railroad brake shoe shown in the drawing. The rectangular mold cavity 10 was defined by a glass-ceramic (CORNING 9608 PYROCERAM) having a uniform thickness, approximately 0.18" thick on the four sides walls and approximately 0.15" thick on the bottom wall, entirely a one piece molding itself.

To prevent excessive local hot spots, a thin zircon base mold wash was applied to the interior surface of the mold which is a conventional foundry practice and is preferred under the present practice.

The resultant iron casting 12 was sound in every respect and exhibits a surface finish superior to both a sand casting and one cast in a steel permanent mold. The same mold 10 was employed for two additional pourings of iron, using a mold wash. The mold survived the two additional castings and survived nineteen subsequent castings of a 3% phosphorous iron poured at 2200°-2300° F. The mold coating or wash (zircon base) was renewed prior to each casting.

The mold when the iron is poured may be setting in a flask of tiny steel shot leveled to the brim of the mold. By making a ditch around the side of the mold to expose the exterior of the mold after pouring the iron it can be observed the mold rapidly attains a dull cherry red color. The dissipation of heat through the mold wall into the surrounding heat sink of steel shot is rapid because of the exceptionally thin mold wall for so large a casting, with heat conduction being assisted by radiation.

It is apparent from additional experimental work that the life of the mold will be increased if, as is preferred, a mold wash is employed. Also, the particulate heat sink medium such as shot, sand, clay, etc. can participate in heat flow while acting as a backup "liner" to buttress the mold wall against the momentum of the heavy, rapid pour of molten metal from the ladle above. It may be mentioned in connection with the foregoing that a glass-ceramic mold transferring heat rapidly enables a great deal of selectivity to be employed in terms of cooling times, often important with respect to contol of base metal transformation. Thus if the mold wash is thick and the glass-ceramic mold is allowed to cool only in the ambient air the solidification of the casting will be retarded compared to the situation when a thin mold wash is used along with particulate heat sink having a high coefficient of thermal conductivity.

This feature of selectivity is to be compared to known permanent molds where the need to cool the mold by water or other means to preserve the mold is sometimes self-defeating in that the casting is subjected to a disadvantageous chill; the casting becomes too hard or brittle for example and/or the mold warps.

There are also indications that the permanence of the mold, in the sense of being able to withstand repeated pours at high temperatures, is due to the thinness of the mold walls, not exceeding approximately 0.2".

SUMMARY

It will be seen from the foregoing that practice under the present invention will solve many foundry problems. The glass-ceramic mold can be employed at much higher temperatures than presently used permanent molds, it exhibits little thermal expansion and contraction, great resistance to thermal shock, and freedom from oxidation, cracking and warpage problems exhibited by permanent mold materials presently in use. The glass-ceramic would preferably transmit (is transparent to) infrared radiation to aid in the needed heat dissipation. The integrity of the mold when operating at high temperature permits utilization for heat transfer in novel ways compared to current practices for permanent molds.

A preferred polycrystalline based on the present work is spodumene, $LiO_2.Al_2O_3.4SiO_2$, but there are eqivalent glass-ceramics also suitable for foundry molds including one in which the polycrystalline (ceramic) phase is cordierite: $2MgO.2Al_2O_3.5SiO_2$.

In conclusion, permanent molds made of metal or graphite need, as a rule, either external cooling or large chill masses for successful operation. This is a distinction which separates such permanent molds from the thin-walled glass-ceramic mold of the present invention which has suitable refractoriness to operate at higher temperatures and yet does not require external cooling or greater wall section. Also, the thin-walled attribute furthers the ability of the mold to withstand thermal shock since the internal and external mold wall surfaces will be closer in temperature.

I claim:

1. A foundry method comprising the step of casting molten metal into a rigid mold cavity represented by metal-confining exterior walls surrounding the mold cavity and substantially uniformly composed of a glass-ceramic in which the predominant microstructure is polycrystalline ceramic converted from the glassy state by devitrification, said polycrystalline ceramic existing as a single phase microstructure, said walls dissipating the heat of the casting in part by radiation, and repeating said step for a second casting of molten metal using the same mold.

2. A method according to claim 1 in which the glass-ceramic is spodumene.

3. A method according to claim 1 including the additional step of submerging the mold wall on the outside in a particulate heat sink, and applying a mold wash to the interior mold surface, the heat sink particles having a heat conductivity selected in terms of the transmission of heat through the walls of the mold so that heat exchange from the casting may be precisely controlled.

4. A method according to claim 2 including the step of submerging the mold wall on the outside in a particulate heat sink, and applying a mold wash to the interior mold surface, the heat sink particles having a heat conductivity selected in terms of the transmission of heat through the walls of the mold so that heat-exchange from the casting may be precisely controlled.

5. A foundry mold having metal-confining walls extended entirely about a mold cavity and composed substantially uniformly of a glass-ceramic in which the predominant microstructure is a polycrystalline ceramic converted from a glassy state of devitrification, said polycrystalline ceramic existing as a single phase microstructure, and the interior surface of the mold walls being coated with a mold wash.

6. A foundry mold according to claim 5 in which the glass-ceramic is spodumene or cordierite.

7. A foundry mold according to claim 5 in which the mold is surrounded by a particulate heat sink.

* * * * *